United States Patent
Olive

(10) Patent No.: US 9,359,083 B2
(45) Date of Patent: Jun. 7, 2016

(54) ROTORCRAFT FITTED WITH A MOUNTING STRUCTURE FOR JOINTLY MOUNTING A CONTROL PANEL AND AVIONICS RACK PREVIOUSLY FITTED WITH A UNITARY CABLING ASSEMBLY

(71) Applicant: AIRBUS HELICOPTERS

(72) Inventor: Richard Olive, Martigues (FR)

(73) Assignee: Airbus Helicopters, Marignane (FR)

( * ) Notice: Subject to any disclaimer, the term of this patent is extended or adjusted under 35 U.S.C. 154(b) by 314 days.

(21) Appl. No.: 14/060,833

(22) Filed: Oct. 23, 2013

(65) Prior Publication Data
US 2014/0117154 A1    May 1, 2014

(30) Foreign Application Priority Data
Oct. 25, 2012    (FR) ...................................... 12 02839

(51) Int. Cl.
*B64D 45/00* (2006.01)
*B64D 43/00* (2006.01)
*B64C 27/04* (2006.01)

(52) U.S. Cl.
CPC ................. *B64D 43/00* (2013.01); *B64C 27/04* (2013.01); *Y10T 29/49004* (2015.01)

(58) Field of Classification Search
CPC ........ B64D 43/00; B64D 11/00; B64C 27/04; Y10T 29/49004
USPC ............................................. 244/1 R; 29/593
See application file for complete search history.

(56) References Cited

U.S. PATENT DOCUMENTS

| 4,780,838 | A | | 10/1988 | Adelson | |
|---|---|---|---|---|---|
| 5,544,842 | A | * | 8/1996 | Smith | ..................... B64D 43/00 244/1 R |
| 6,450,822 | B1 | * | 9/2002 | Eller | .................. H01R 13/6315 439/247 |
| 6,572,376 | B1 | * | 6/2003 | Saunders | ................. G09B 9/08 244/194 |
| D592,126 | S | * | 5/2009 | da Silveira | .................... D12/345 |
| D682,771 | S | * | 5/2013 | Amante | ....................... D12/192 |

(Continued)

FOREIGN PATENT DOCUMENTS

EP    0283926    9/1988
FR    2962617    1/2012

OTHER PUBLICATIONS

Search Report for FR 1202839, Completed by the French Patent Office on Jun. 21, 2013, 6 Pages.

*Primary Examiner* — Brian M O'Hara
*Assistant Examiner* — Assres H Woldemaryam
(74) *Attorney, Agent, or Firm* — Brooks Kushman P.C.

(57) ABSTRACT

A rotorcraft fitted with means for mounting at least one front avionics rack (3, 3') and man-machine interface instruments (2) on board a fuselage structure (4). A mounting structure (1) comprises a slotted body forming compartments for receiving interface instruments (2), the avionics rack (3, 3'), and a unitary cabling assembly (12) suitable for incorporating as a block with the mounting structure (1). The mounting structure (1) is installed as a block on the fuselage structure (4) after its functioning has been verified. The unitary cabling assembly (12) may also include separation connectors (14) segregating communications of the front avionics rack (3, 3') respectively with remote computers (5) by means of a primary communications bus of the multiplexed, unidirectional, or bidirectional type, and with ancillary equipment (6) and/or with on-board instruments (7) by means of a secondary fieldbus.

16 Claims, 3 Drawing Sheets

(56) References Cited

U.S. PATENT DOCUMENTS

| | | | | |
|---|---|---|---|---|
| 2007/0008188 A1* | 1/2007 | Firra | ............... | B64D 43/00 340/973 |
| 2007/0198141 A1* | 8/2007 | Moore | ............... | B64D 43/00 701/3 |
| 2010/0076628 A1* | 3/2010 | Boorman | ............... | G01C 23/00 701/11 |
| 2010/0078533 A1* | 4/2010 | Bopp | ............... | B64D 43/00 248/220.21 |
| 2010/0081307 A1* | 4/2010 | Bopp | ............... | B64D 43/00 439/248 |
| 2010/0085695 A1* | 4/2010 | Vicich | ............... | B64D 43/00 361/679.21 |
| 2010/0085710 A1* | 4/2010 | Bopp | ............... | B64D 43/00 361/697 |
| 2010/0090868 A1* | 4/2010 | Hall | ............... | G01C 23/00 340/971 |
| 2010/0140397 A1* | 6/2010 | Van Wassenhove | ... | B64D 43/00 244/118.5 |
| 2010/0204855 A1* | 8/2010 | Vial | ............... | G05B 23/0272 701/14 |
| 2012/0008697 A1 | 1/2012 | Emonide et al. | | |
| 2012/0075120 A1* | 3/2012 | Barbieri | ............... | B64D 43/00 340/946 |
| 2013/0148325 A1* | 6/2013 | Guering | ............... | B60K 37/00 361/809 |
| 2013/0209256 A1* | 8/2013 | Yates | ............... | F01D 7/00 416/112 |
| 2014/0077025 A1* | 3/2014 | Yates | ............... | B64C 13/04 244/17.13 |

* cited by examiner

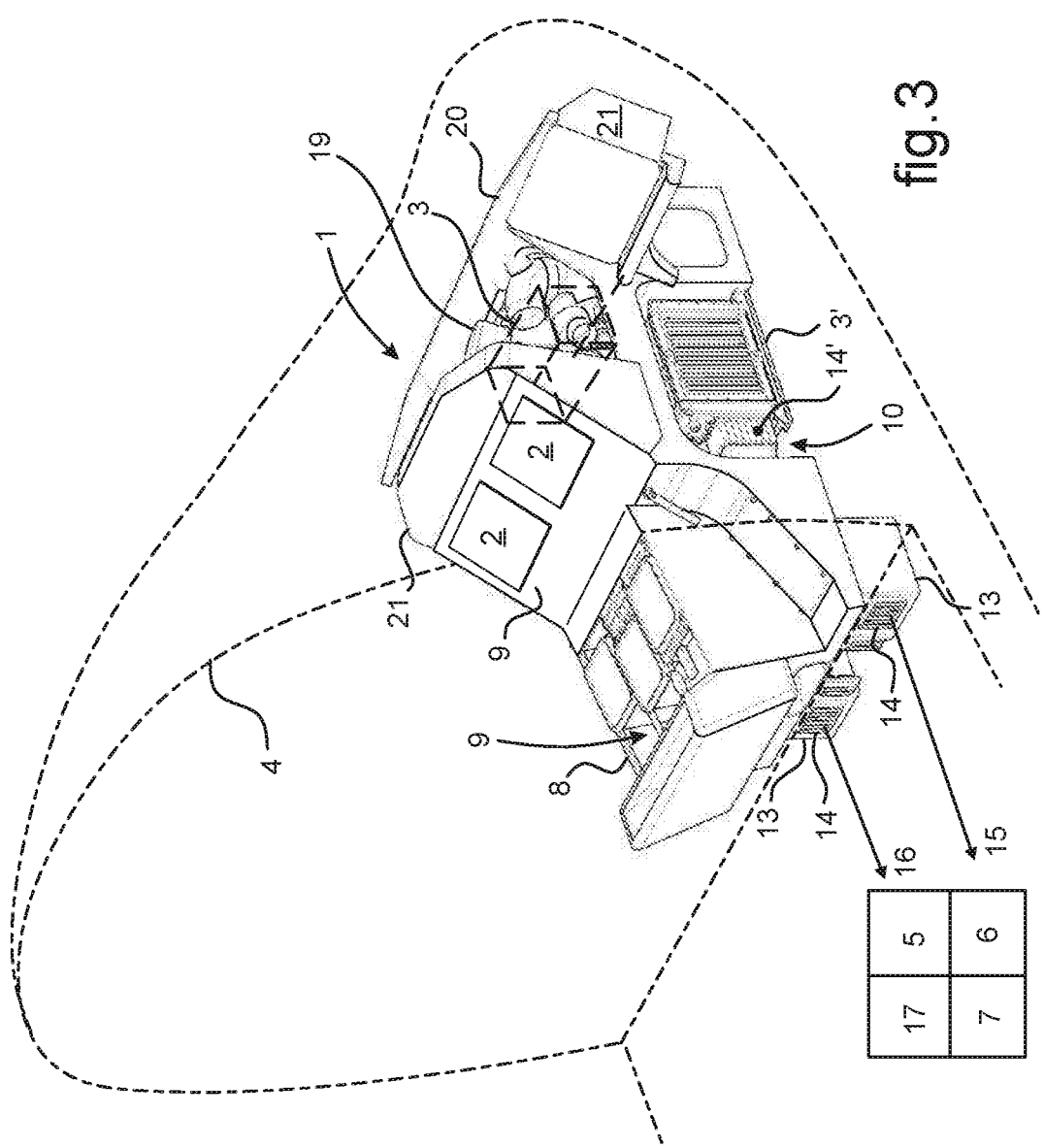

ROTORCRAFT FITTED WITH A MOUNTING STRUCTURE FOR JOINTLY MOUNTING A CONTROL PANEL AND AVIONICS RACK PREVIOUSLY FITTED WITH A UNITARY CABLING ASSEMBLY

CROSS REFERENCE TO RELATED APPLICATIONS

This application claims priority to French patent application No. FR 12 02839 filed on Oct. 25, 2012, the disclosure of which is incorporated in its entirety by reference herein.

BACKGROUND OF THE INVENTION (1) Field of the Invention

The present invention relates to the field of fitting out equipment of an aircraft, in particular a rotorcraft, for installation on a fuselage structure of the rotorcraft. The present invention relates more particularly to ways of mounting such equipment on board a rotorcraft, the equipment comprising man-machine interface instruments and a front avionics rack.

(2) Description of Related Art

Rotorcraft cockpits are fitted with instruments that provide an interface between a human pilot and various functional members of the rotorcraft.

The interface instruments comprise control instruments that can be operated by the pilot, such as control knobs and/or sliders, for example. The interface instruments also include instruments for monitoring the functioning of the rotorcraft, in particular by means of a display, such as screens and/or analogous display members. Such interface instruments are used by the pilot in order to control the operation of the rotorcraft.

By way of example, the functional members may be computers used for managing the operation of the rotorcraft, ancillary equipment of the rotorcraft, or indeed on-board instruments such as information sensors and measurement and/or calculation means that are of use in operating the rotorcraft. The ancillary equipment may comprise, for example: comfort equipment such as an installation for providing ventilation, heating, and/or air conditioning, such as a lighting system, or such any other auxiliary equipment of the rotorcraft.

In order to manage the operation of the rotorcraft, the computers, the interface instruments, the ancillary equipment, and the various on-board instruments with which the rotorcraft is provided are distributed about the rotorcraft and they are put into communication with one another via a cabling and communications bus network.

In this context, the interface instruments are grouped together in an instrument panel incorporated in a dashboard of the cockpit. Interface instruments are installed in particular on a front face support, e.g. arranged as a desk and/or as a console and/or any other analogous support suitable for receiving said interface instruments. The front face support or analogous structure carrying one or more interface instruments has various compartments arranged for selectively receiving interface instruments.

Such rotorcraft cockpit arrangements are disclosed for example in the following documents: U.S. Pat. No. 4,780,838 (R. L. Adelson), US 2012/075120 (A. Barbieri), EP 0 283 926 (Messerschmitt Boelkow), and US 2007/198141 (T. G. Moore).

The computers used for managing the operation of the rotorcraft are commonly distributed in various avionics racks in order to be installed on board the rotorcraft. These various avionics racks include at least one front avionics rack that is placed at the front of the rotorcraft. The avionics racks form stations for selectively hosting one or more calculation units combining various computers and/or other electronic means for controlling the operation of the rotorcraft.

The interface instruments and the computers housed in the avionics racks are fitted with connectors enabling them to be electrically connected with various members of the rotorcraft by means of cabling. The various computers distributed on board the rotorcraft are put into communication with one another via a communications network that makes use of avionics cabling suitable for conveying communications bus signals, of data concentrators, and of gateway components that are fitted to various avionics racks.

More particularly, the cabling provides a function of electrically powering the interface instruments and the computers from the on-board electricity network of the rotorcraft. The cabling also provides a function of conveying signals for putting the interface instruments and the computers into communication with one another and/or with various computers distributed around the rotorcraft. The cabling also serves to communicate with various pieces of equipment and/or members of the rotorcraft presenting operation that needs to be controlled, where such equipment and/or members are potentially sources of information that is useful to the computers and to the interface instruments.

It is conventional to install a fuselage structure of the rotorcraft on an assembly line in order to mount its equipment therein. In the context of the present invention, said fuselage structure should be considered as corresponding to the front portion of the rotorcraft that is to be equipped, in particular for installing interface instruments, at least one front avionics rack, and cabling associated therewith for providing electrical power and for establishing communication with various remote members distributed around the rotorcraft.

It is desirable for the interface instruments, or indeed the front avionics rack, to be installed on the fuselage structure as late as possible in order to limit any risk of damage.

That is why it is common practice initially to install a front face support on the fuselage structure in the cockpit. Then cabling made up of various harnesses specifically for the interface instruments and the computers housed in the front avionics rack is installed on the fuselage structure. The functioning of the cabling is then verified and, where necessary, cabling repairs are carried out.

Thereafter, the interface instruments are installed on the front face support. The front avionics rack is installed on the fuselage structure in a dedicated location, in particular a location in the nose of the rotorcraft. The cabling is selectively connected to the interface instruments and to the computers housed in the front avionics rack, by means of connectors with which they are fitted. The functioning of the various interface instruments and computers housed in the front avionics rack is verified, and where necessary, repairs are carried out.

In this context, it is found that there is room to improve such ways of installing interface instruments and the front avionics rack on the fuselage structure.

For example, it is found that it would be useful to shorten the time required for fitting equipment to said fuselage structure. It is also desirable to make it easier to fit out the cockpit and install the front avionics rack. Nevertheless, that is made difficult because of the various sequences performed by operators in order to fit out the cockpit and in order to install the front avionics rack, given the confined space in which the operators must act, given the shape of the front fuselage structure of the rotorcraft.

By way of example, it has also been observed that the organization of the assembly line specifically for fitting equipment to said fuselage structure would benefit from being simplified. In particular, it is useful to improve the organization whereby the assembly line is supplied with components in order to limit the number of different kinds of component beside the assembly line and in order to simplify the operations that need to be performed to install such components on board the rotorcraft.

By way of example, it should also be considered that the way the front zone of a rotorcraft is arranged must also satisfy specific requests depending on various operating needs of rotorcraft. Such numerous needs involve in particular specific organizations for the front avionics rack and for the means for establishing communication between the various computers, pieces of ancillary equipment, and/or on-board equipments distributed around the rotorcraft. Consequently, standardizing the arrangement of the fuselage structure and the organization of the assembly line is not made easy. It is desirable for the specific features of the front zone for satisfying the needs of such a specific request to be taken into account as late as possible on the assembly line in order to improve standardization of the organization of the front zone of a rotorcraft.

It has also been observed for example that the techniques used for fitting equipment to said fuselage structure make it difficult subsequently to reorganize the front avionics rack. Such possible subsequent reorganization involves potentially incorporating computers housed in the front avionics rack in the context of an upgradable communications network, such as that disclosed by document FR 2 962 617 (Eurocopter France).

In the context of a search for said improvements, it is necessary to avoid overcomplicating the organization and the cabling specific to the interface instruments and to the avionics rack. It is also desirable to take advantage of said search for improvements to reduce the overall weight of the means used in the context of such a search. Account should also be taken of constraints associated with rotorcraft maintenance, where maintenance must be easy to perform and must be capable of being carried out while limiting the costs of intervention.

BRIEF SUMMARY OF THE INVENTION

The object of the present invention is to provide ways of arranging a cockpit and of installing a front avionics rack on a fuselage structure of a rotorcraft.

The present invention seeks more particularly to provide solutions that provide a good compromise for obtaining improvements in the light of the above-mentioned observations and constraints.

A rotorcraft of the present invention is fitted with mounting means for mounting on board a fuselage structure at least one front avionics rack and a cockpit including at least one man-machine interface instrument. The front avionics rack incorporates at least one calculation unit having one or more computers, and at least one communications bus connecting the calculation unit to various members of the rotorcraft.

More particularly, the mounting means comprise:

mechanical assembly means for assembling the interface instrument and the front avionics rack on said fuselage structure; and at least one cable fitted to said at least one interface instrument and said at least one front avionics rack in order to power them electrically and in order to put them into communication with remote members distributed aboard the rotorcraft. Such remote members comprise at least one computer, at least one piece of ancillary equipment of the rotorcraft, and at least one on-board instrument. Such an on-board instrument comprises in particular an instrument from the group of instruments comprising at least any one of at least one actuator, at least one information sensor, and/or at least one calculation and/or measurement means, for example.

According to the present invention, the mechanical assembly means comprise a mounting structure for jointly mounting said at least one interface instrument and said at least one front avionics rack on the fuselage structure.

Said mounting structure comprises a slotted body having fastener means for fastening to the fuselage structure. The slots of the slotted body provide compartments housing in the front face of the slotted body at least one interface instrument and housing in a rear zone of the slotted body at least one front avionics rack. At least one compartment provides at least one passageway for passing a unitary cabling assembly suitable for being incorporated as a block on the mounting structure. Said unitary cabling assembly is fitted with separation connectors mounted on the slotted body, to provide a connection for said at least one interface instrument and for said at least one calculation unit with said remote members via said separation connectors.

In the context of structurally simplifying the unitary cabling assembly, it is proposed to simplify the organization of the separation connectors while enhancing potential for subsequent upgrading of the organization of the communications means fitted to the mounting structure and more particularly to the front avionics rack. Such communications means are means for exchanging information between the mounting structure and remote members distributed on board the rotorcraft, such as various calculation means, various pieces of equipment, in particular pieces of ancillary equipment, and/or various on-board instruments.

More particularly, said separation connectors advantageously comprise avionics connectors for communication between said at least one front avionics rack and said remote members. Said avionics connectors are segregated to provide at least one main connector set and at least one secondary connector set of a primary communications module forming part of the front avionics rack. The main connector set is an interface connector set between the calculation unit and at least one said computer. The secondary connector set is an interface connector set between the primary communications module and at least one secondary communications module incorporating a secondary data concentrator for concentrating data collected from any one of at least one said on-board instrument and/or at least one said piece of ancillary equipment.

Segregating said avionics connectors serves to simplify the structure of the unitary cabling assembly, while providing optimized capacities for communication between the mounting structure and said remote members that are potentially numerous and that might be changed.

Advantageously, the secondary connector set is in communication with the calculation unit specific to said at least one avionics rack via a gateway component of the primary communications module.

In one embodiment, the primary module comprises:

at least one digital primary communications bus between the calculation unit and the computer. The primary communications bus may potentially equally well be of the unidirectional type, of the bidirectional type, and/or of the multiplexed type. By way of example, such a primary communications bus may be a redundant Ethernet network such as an avionics full-duplex switched Ethernet bus (AFDX), a multiplexed serial data bus such as a military standard MIL-STD-1553 bus, or a standard unidirectional bus such as an Arinc 429 bus or any other communications bus derived from the Arinc 429 bus (where "Arinc" is derived from Aeronautical Radio Inc.);

at least one secondary fieldbus between the calculation unit and the secondary module. The secondary fieldbus is advantageously a deterministic digital bus of multiplexed type such as a controller area network (CAN) or some analogous fieldbus.

In particular, said secondary data concentrator for concentrating data includes the functions of receiving data, of acquiring data, of converting data from digital to analog format and from analog to digital format, and of routing information collected by the secondary data concentrator. Such collected information comprises in particular information delivered firstly by the calculation unit, in particular via the gateway unit, and secondly by said on-board instruments and/or by a said piece of ancillary equipment.

Preferably, the gateway component is also in communication with a primary data concentrator for concentrating data collected from at least one man-machine interface instrument, and more particularly from a manual control member operable by a human pilot of the rotorcraft. By way of example, such a manual control member is arranged as a control knob and/or as a slider, and in particular it is installed on a control stick, more specifically a flight control stick.

The unitary cabling assembly incorporates at least the communications harnesses that may be constituted equally well by electrical harness or by optical harness.

The unitary cabling assembly incorporates more particularly electrical power supply harnesses for the various electricity-consuming members included in the mounting structure. The communications harnesses are in particular harnesses for interconnecting the interface instrument(s) and the avionics rack(s) via auxiliary connectors fitted to auxiliary harnesses incorporated in the unitary cabling assembly, and/or for connecting the interface instrument(s) and the avionics rack(s) with said remote members via said separation connectors fitted to the communications harnesses between the mounting structure and the environment outside it.

In a preferred embodiment, at least one of the slots of the slotted body provides a compartment housing at least one piece of ancillary equipment of the rotorcraft. The unitary cabling assembly incorporates at least one harness allocated to said piece of ancillary equipment, serving to power it electrically and to put into communication with at least one interface instrument and/or with at least one computer of the front avionics rack, essentially via a said secondary communications module.

Said piece of ancillary equipment housed in a said compartment that is provided therefor may for example be an installation for providing ventilation, heating, and/or air conditioning, and/or a module for managing lighting of the rotorcraft.

Advantageously, the slotted body provides a passage therethrough giving access to said at least one front avionics rack and to the unitary cabling assembly from said at least one compartment provided in a front face of the slotted body.

In a preferred embodiment, said slots of the slotted body provide at least:

in a front zone of the slotted body forming the front face element of a control panel, at least one first compartment of the front face element housing at least one interface instrument;

in a rear zone of the slotted body forming a technical equipment space, at least one second compartment housing at least one front avionics rack;

in a middle zone of the slotted body between the front zone and the rear zone, at least one passage for passing the unitary cabling assembly and possibly also at least one passage giving access from the front face element to the unitary cabling assembly and to the technical equipment space; and at least one housing receiving said separation connectors.

In an advantageous embodiment, the slotted body is provided with mounting means for mounting at least one support included in the mounting structure. Said support is removable and interchangeable from among a plurality of supports, with numbers and arrangements that are selectable. Said support includes in particular at least one compartment housing at least one interface instrument.

The unitary cabling assembly may also incorporate at least one harness for connecting at least one on-board instrument with the front avionics rack, in particular via at least one said avionics connector.

Such a connection of the interface instrument is potentially made via a said secondary communications module, or via a primary data concentrator incorporated in said primary communications module, such a data concentrator potentially being in communication with a plurality of interface instruments and/or of on-board instruments.

The unitary cabling assembly advantageously incorporates auxiliary harnesses provided with auxiliary connectors, said harnesses providing connection to the separation connectors respectively of a said at least one interface instrument and of a said at least one front avionics rack.

It should be observed that it is conventional for at least one main cable to go from a quarter-hull zone of the fuselage of the rotorcraft by being extended towards a front tip zone of said fuselage in order to distribute various harnesses of the main cabling at least to a front avionics rack, a control desk, and an instrument panel. Using the arrangements of the present invention, such main cabling respectively on the right and left sides of the rotorcraft, and coming in particular from said quarter-hull zone, is advantageously put into communication with the mounting structure in the cockpit in a front zone of the mounting structure. Such arrangements make it possible to avoid taking such main cabling to the front of the rotorcraft, and in particular to the front tip of the fuselage behind the mounting structure.

The present invention also provides a method of preparing a mounting structure of a rotorcraft in accordance with the present invention. The method of the present invention comprises the following operations:

fabricating the slotted body;

fabricating the unitary cabling assembly fitted at least with the separation connectors and possibly also with auxiliary connectors in a workshop and then testing the functioning of the unitary cabling assembly and, where necessary, making repairs;

mounting the unitary cabling assembly and the separation connectors on the slotted body in a workshop;

mounting said at least one interface instrument and said at least one front avionics rack housing the calculation unit on the slotted body in a workshop; and where appropriate mounting a said piece of ancillary equipment;

testing the functioning of the resulting mounting structure in a workshop, and, where necessary, making repairs; and installing the resulting mounting structure as tested on the fuselage structure as presented on a rotorcraft assembly line.

BRIEF DESCRIPTION OF THE SEVERAL
VIEWS OF THE DRAWINGS

Embodiments of the present invention are described with reference to the figures of the accompanying sheets, in which:

FIG. 1 is made up of a plurality of successive diagrams a, b, c, d, e, and f respectively representing various steps during assembly of the mounting structure on a front fuselage structure of the rotorcraft;

FIG. 3 illustrates the mounting structure shown in FIG. 1 when installed on the front fuselage of the rotorcraft.

DETAILED DESCRIPTION OF THE INVENTION

Figure 1:
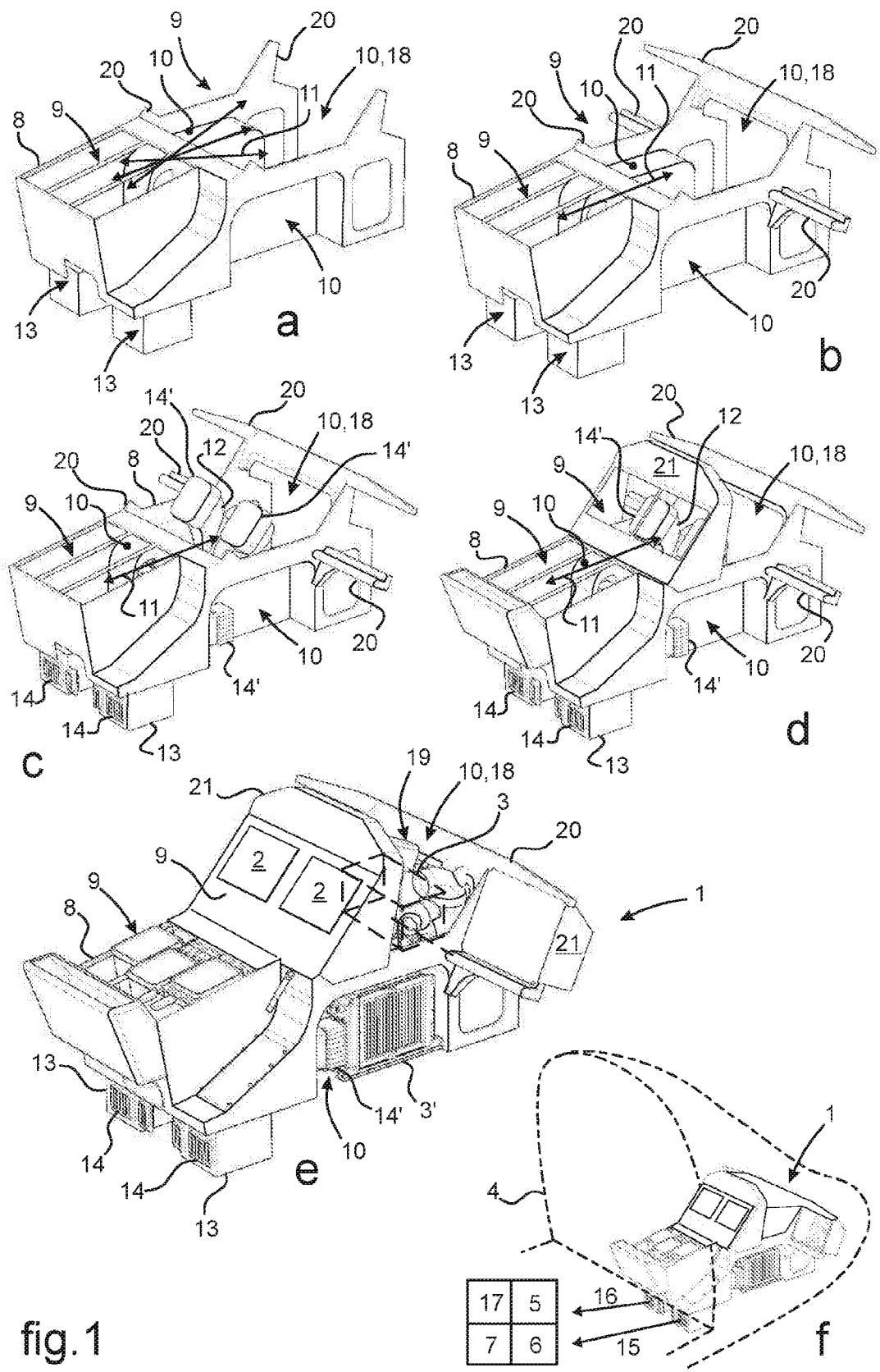
FIG. 1 is an illustration of a mounting structure fitted to a rotorcraft in an embodiment of the present invention.

In FIG. 1, a mounting structure 1 is organized for joint installation of interface instruments 2 and one or more front avionics racks 3, 3' on a fuselage structure 4 of a rotorcraft.

The interface instruments 2 are for fitting to a cockpit of the rotorcraft, being grouped together as a control panel. The interface instruments 2 comprise in particular display member, such as screens, and control members, such as knobs or sliders that can be moved by a human pilot of the rotorcraft.

The front avionics rack(s) 3, 3' are individually generally in the form of a box housing at least one calculation unit in communication with remote computers 5, with pieces of ancillary equipment 6, and/or with various on-board instruments 7 for capturing, measuring, and/or calculating information that is useful for controlling the conduct in flight of the rotorcraft. The computers 5 are installed locally on the rotorcraft at a distance from the front avionics racks 3, 3', and for example they may be incorporated in a rear avionics rack. The ancillary equipment 6 may for example comprise comfort equipment and/or any other equipment that does not perform a function that is essential for piloting the rotorcraft.

The mounting structure 1 has a slotted body 8 with means for fastening to the fuselage structure 4 of the rotorcraft. Such fastener means are ordinary means, e.g. using sealant and/or fastener members, such as for example: screws, bolts, rivets, or other analogous fastener members.

In diagrams a, b, c, and d, more particularly, the slots in the slotted body 8 provide compartments 9 suitable for receiving interface instruments 2 in a front zone of the slotted body 2 that constitutes a front face element. Such a front face element is arranged in particular as a raised console of a control panel. Compartments 10 formed by the slotted body 8 are also suitable for jointly or individually housing at least one front avionics rack 3 in a rear zone of the slotted body 8 forming a technical equipment space.

In the example shown, the front avionics racks 3, 3' comprise two lateral avionics racks 3' arranged in an understructure respectively on one side and the other of the slotted body 8, and optionally a front avionics rack 3 arranged at the rear end of the slotted body 8.

In addition, at least one slot of the slotted body provides in its middle region at least one passageway 11 for passing cabling of the mounting structure 1. Such cabling is advantageously in the form of a unitary cabling assembly 12 combining as a block all of the electrical and/or optical harnesses needed to enable the mounting structure 1 to operate.

The concepts "front", "rear", and "middle", should be considered relative to the orientation of the mounting structure 1 when installed on the fuselage structure 4. When installed on the fuselage structure 4, the front zone of the mounting structure 1 is the zone facing forward towards a position of receiving the pilot of the rotorcraft in the cockpit.

The rear zone of the mounting structure 1 is considered as being a location such that the front zone lies between said position for receiving the pilot and the rear zone. Such a rear zone is potentially located at the rear end of the slotted body 8, in a lateral zone of the slotted body 8, or indeed in an understructure of the slotted body 8.

The middle zone of the mounting structure 1 is a zone interposed between the front zone and the rear zone, enabling the unitary cabling assembly 12 to extend between the interface instruments 2 and the front avionics rack(s) 3, 3' and potentially emerging from the slotted body 8 via compartments 13 reserved for separation connectors 14 incorporated in the unitary cabling assembly 8.

More specifically, in the embodiment shown, the slotted body 8 has, in its front end, at least one first compartment 9 for receiving at least one interface instrument 2, and in its rear zone at least one second compartment 10 for receiving at least one front avionics rack 3, 3'.

In the embodiment shown, at least one first compartment 9 is arranged in the front of the slotted body 8, in a zone of the slotted body 8 that is arranged as a console extended by a front element. At least one said first compartment 9 is potentially arranged laterally relative to the slotted body 8, such as in the end of the slotted body 8 in the embodiment shown. A plurality of second compartments 10 respectively receive individual front avionics racks 3, 3', including two said front avionics racks 3' arranged laterally in the understructure on either side of the slotted body 8, and one said front avionics rack 3 arranged in the rear end of the slotted body 8.

One or more passageways 11 for passing the unitary cabling assembly 12 are arranged between the first compartment(s) 9 and the second compartment(s) 10. More particularly, in the embodiment shown, a middle passageway is arranged between the first compartment 9 arranged in the front of the slotted body 8 and a second compartment 10 arranged in the rear end of the slotted body 8. The unitary cabling assembly 12 occupies a middle internal volume of the slotted body 8 extending from the front face towards the end and the understructure of the slotted body. The passageway(s) 11 for passing the unitary cabling assembly 12 also advantageously form a passageway giving access from the first compartment 9 arranged at the front of the slotted body 8 towards the unitary cabling assembly 12 and towards the compartment 10 forming the technical equipment space for receiving the front avionics rack(s) 3, or indeed towards an auxiliary compartment 18 forming a technical equipment space for receiving ancillary equipment 19.

The slotted body 8 also has housings 13 for receiving separation connectors 14 of the harnesses making up the unitary cabling assembly 12. Such separation connectors 14 provide connections between the various harnesses incorporated in the unitary cabling assembly 12 and cabling 15, 16 external to the mounting structure 1. The separation connectors 14 are received in the housings 13 that are distributed laterally on the understructure of the slotted body 8 in order to provide fire safety for the connection between the mounting structure 1 and its external environment.

Said external cabling 15, 16 is allocated to remote members 5, 6, 7, and to at least one electrical power supply source 17 of the rotorcraft, to which the mounting structure 1 needs to be connected. The separation connectors 14 make it easy to make a connection and conversely to break a connection between the mounting structure 1 and said remote members 5, 6, and 7 and said electrical power supply source 17.

The unitary cabling assembly 12 is made up of various harnesses for connecting the mounting structure 1 with the outside, or indeed for connecting interface instruments 2 to one another and/or for connecting interface instruments 2 with the front avionics rack(s) 3, 3'. Such connections can be established easily and quickly by an operator using the separation connectors 14 fitted to the unitary cabling assembly 12 for the purpose of connecting the mounting structure 1 with the outside, and by means of auxiliary connectors 14' for connecting individually to the harness separation connectors 14 allocated to one or more interface instruments 2, to one or more front avionics racks 3, and/or to one or more pieces of ancillary equipment 19 housed in the slotted body 8.

Connecting the mounting structure 1 with the outside by means of the unitary cabling assembly 12 serves to provide electrical power for the interface instruments 2 and the front avionics rack(s) 3, 3' via the electrical power supply source 17, e.g. an electricity network on board the rotorcraft. Said connection also makes it possible to put interface instruments 2 and/or front avionics rack(s) 3, 3' into communication with various ones of said computers 5, the pieces of ancillary equipment 6, and/or on-board instruments 7 distributed on board the rotorcraft. Such communication is potentially provided by electrical and/or optical harness incorporated as blocks in the unitary cabling assembly 12.

As can be seen more particularly in diagram e, a compartment 18 of the slotted body 8 advantageously houses a piece of ancillary equipment 19 of the rotorcraft, such as an installation for providing ventilation, heating, and/or air conditioning. By way of example, such a compartment 18 is provided in the middle zone, in the understructure, or in the end of the slotted body 8, e.g. as in the embodiment shown.

In the embodiment shown in FIG. 1, the slotted body 8 has mounting means 20 for mounting a support 21 for receiving one or more interface instruments 2. Such mounting means 20 may particularly be incorporated in the slotted body 8, e.g. being formed by rails for receiving or members for fastening the support 21. Such mounting means 20 are also potentially separate items that are fastened on the slotted body 8, or indeed they are potentially formed by a specific slot of the slotted body 8 that is dedicated to receiving the support 21. Such a specific slot is potentially formed by a said first compartment 9 suitable itself for receiving an interface instrument 2. More generally, and depending on requirements, a slot of the slotted body 8 may receive a said movable support 21 selected from a set of said supports 21 that are interchangeable and that belong to respective arrangements.

The unitary cabling assembly 12 is easily installed as a block on the slotted body 8 by an operator. Installing the unitary cabling assembly 12 on the slotted body 8 and verifying the operation of the installed unitary cabling assembly 12 should be carried out prior to installing the interface instruments 2 and the front avionics rack(s) 3. The unitary cabling assembly 12 may also be verified after it has been installed on the slotted body 8.

Once the interface instruments 2 and the avionics racks 3, 3' have been installed, their respective functions are checked prior to implanting the mounting structure 1 on the fuselage structure 4.

More particularly, the slotted body 8 as prepared in a workshop (diagram a) is installed on an assembly station. The slotted body 8 may optionally incorporate said mounting means 20 molded therewith. Nevertheless, said mounting means 20 may also be added to the slotted body 8 for the purpose of subsequently receiving interface instruments 2 (diagram b).

Thereafter, the unitary cabling assembly 12 is mounted as a unitary block on the slotted body 8 and its functioning is verified (diagram c). If necessary, in a following step, a support 21 may be installed on the slotted body 8 (diagram d) using the mounting means 20 for subsequently receiving interface instruments 2. The interface instruments 2, and where appropriate the ancillary equipment 19, are then installed in part or all of the slotted body (diagram e), and the functioning thereof is verified.

In a following step, the front avionics rack(s) 3, 3' is/are mounted on the slotted body 8 (diagram e) and the functioning thereof is verified.

Where appropriate, any remaining interface instruments 2 are potentially installed after installing the front avionics rack(s) 3, 3'. The functioning of the interface instruments 2 and, where appropriate, of the ancillary equipment 19 is potentially verified before or after installing the front avionics rack(s) 3, 3' on the slotted body 8, and otherwise it is verified simultaneously with verifying the functioning of the already-installed front avionics rack(s) 3.

The mounting structure 1 comprising the slotted body 8 fitted with the unitary cabling assembly 12, with the interface instruments 2, and with the front avionics rack(s) 3, 3', and possibly also with the ancillary equipment 19, is then taken to the side of a rotorcraft assembly line. Such a mounting structure 1 is easy for operators to handle in spite of the confined environment of the fuselage structure 4.

The fuselage structure 4 is already installed on the assembly line in order to receive the mounting structure 1 in a single mounting operation (diagram f). Such an operation of mounting the mounting structure 1 on the fuselage structure 4 is performed easily by securing the mounting structure 1 as a single block on the fuselage structure, and by making connections via the separation connectors 14 between the unitary cabling assembly 12 and the external cabling 15, 16 associated respectively with the remote members 5, 6, 7, and with the electrical power supply source 17.

In FIG. 3, a mounting structure 1 is assembled in accordance with the arrangements shown in FIG. 1 and it is installed after being assembled on the fuselage structure 4. The mounting structure 1 installed on the fuselage structure 4 quickly and easily by an operator. More particularly, the mounting structure 1 is fastened to the fuselage structure 4, in particular to a floor structure, by any appropriate fastener means such as mutual engagement, adhesive bonding, and/or by separate fastener members such as rivets, screws, or bolts, for example.

One or more external cables 15, 16 are put into connection with the mounting structure 1 via the separation connectors 14, which are accessible in the understructure and in a front zone of the mounting structure 1. Such external cables 15, 16 are advantageously distributed laterally as a right external cable 15 and a left external cable 16. Connecting the mounting structure 1 via the separation connectors 14 arranged at the front of the mounting structure 1 avoids any need to extend external cables 15, 16 from a rear zone or a middle zone of the rotorcraft towards a nose zone of the rotorcraft located at the rear of the mounting structure 1.

Figure 2:
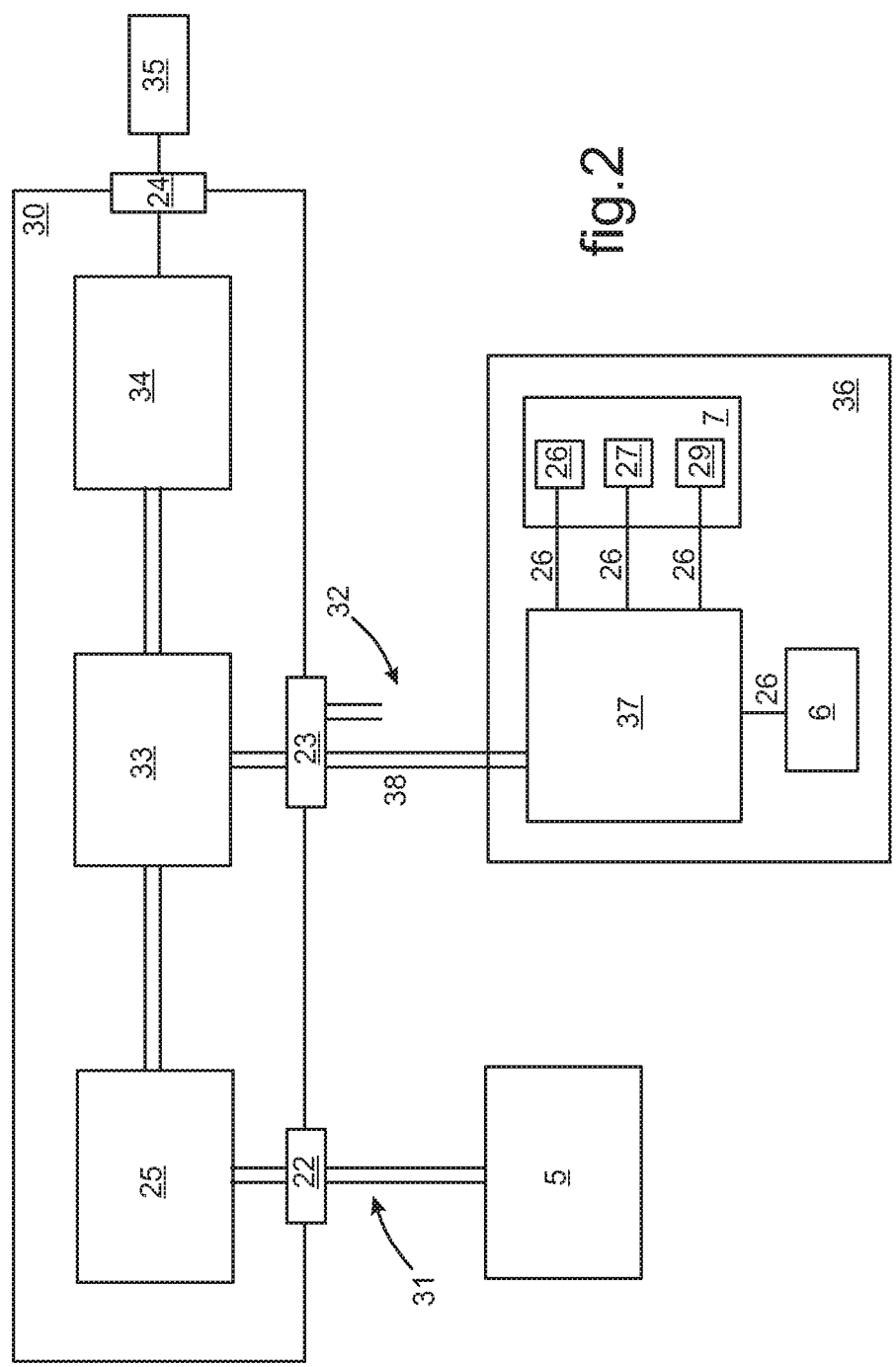
FIG. 2 is a diagram showing an example of the organization of means providing communication between a mounting structure in accordance with the present invention and remote members distributed over the rotorcraft.

In FIG. 2, a unitary cabling assembly incorporated in the mounting structure shown in FIG. 1 comprises avionics connectors 22, 23, 24 for conveying communications signals between the front avionics rack(s) 3, 3' and the various remote members 5, 6, 7 external to the mounting structure. These remote members include in particular at least one said computer 5, a said piece of ancillary equipment 6, and a said on-board instrument 7.

The avionics connectors 22, 23, 24 are segregated so as to separate at least the connection of a calculation unit 25 of the front avionics rack(s) 3, 3' respectively with at least one said computer 5 and with at least one said piece of ancillary equipment 6 and/or at least one on-board instrument 7. The avionics connectors are segregated in sets comprising a main connector set 22 between the front avionics rack(s) 3, 3' and said computer 5, and a secondary connector set 23 forming an interface between the front avionics rack(s) 3, 3' and said ancillary equipment 6 and/or on-board instruments 7.

As non-limiting examples, the computer(s) 5 is/are incorporated in particular in at least any one of the following control units that are commonly fitted to rotorcraft:

a unit for controlling the operation of a power plant fitted to the rotorcraft, such as a full authority digital engine control (FADEC) unit;

a unit for monitoring the operation of the rotorcraft, such as a health and usage monitoring system (HUMS);

in general manner, one or more avionics racks distributed on board the rotorcraft, and in particular a rear avionics rack. Such avionics racks house various calculation means that are essential for controlling the piloting of the rotorcraft;

electric flight control modules, such as a flight control computer (FCC); and an antivibration system such as an antivibration active system (AVAS).

The piece(s) of ancillary equipment 6 in communication with the mounting structure comprise at least one accessory of the rotorcraft of operation that is controlled from at least one interface instrument and/or from at least one said calculation unit 25 housed in a front avionics rack 3, 3'.

A said on-board instrument 7 may be constituted in particular by a member delivering information 26 that is useful for running the calculation unit 25. As non-limiting examples, such an on-board instrument 7 may for example be an information sensor 27, an actuator 28, and/or a measurement and/or calculation instrument 29. Such on-board instruments 7 are commonly fitted to rotorcraft in order to enable a pilot to control the operation of the rotorcraft. That pilot may equally well be a human pilot and/or an autopilot.

The mounting structure, and more particularly the front avionics rack(s) 3, 3', incorporates a primary module 30 for communication between the calculation unit 25 and the said remote members 5, 6, 7 external to the mounting structure. Such a primary module 30 makes use of various communications buses 31, 32 depending on which remote member 5, 6, 7 is to be put into communication with the calculation unit 25.

The primary module 30 is in communication with at least one computer 5 external to the mounting structure via an avionics connector having a main connector 22. The communication between the calculation unit 25 and a said computer 5 takes place over a primary communications bus 31 depending on requirements relating to the function of the information exchanged between the calculation unit 25 and the remote computer(s) 5.

In this context, the primary communications bus 31 between the calculation unit 25 and the remote computer(s) 5 may equally well be any one of at least: a communications bus of the unidirectional type, of the bidirectional type, and/or of the multiplexed type. Arbitration protocols used on such communication buses are preferably deterministic, making use of a relationship that may be of the master-slave type or of the token-ring type.

The primary module 30 is in communication with at least one piece of ancillary equipment 6 and/or with at least one on-board instrument 7 via at least one avionics connector comprising a secondary connector set 23 connecting the calculation unit 25 to at least one secondary communications module 36. Such communication between the primary module 30 and at least one piece of ancillary equipment 6 and/or at least one on-board instrument 7 makes use of a secondary communication bus 32.

The main connector set 22 and the secondary connector set 23 are potentially incorporated in a single avionics connector, or they are potentially incorporated in respective avionics connectors.

More particularly, the primary module 30 includes a gateway component 33 interposed between the calculation unit 25 and the secondary avionics connector 23. This gateway component 33 may also be in communication with a primary data concentrator 34 in communication with at least one man-machine interface instrument 35 arranged as a manual control member. Such a manual control member may for example be a control knob arranged on a flight control stick that can be operated by a human pilot of the rotorcraft.

The gateway component 33 is in communication with a secondary data concentrator 37 included in the secondary communications module 36. This secondary concentrator 37 collects information 26 generated by the ancillary equipment 6 and/or the on-board instrument 7, and it collects information 38 coming from the calculation unit 35 via the gateway component 33. In this context the secondary concentrator 37 includes in particular functions of receiving and acquiring collected information 26, 38, and functions of converting the collected information 26, 38 between digital/analog data formats and analog/digital data formats. The secondary concentrator 37 also includes a function of routing the various kinds of collected information 26, 38.

What is claimed is:

1. A rotorcraft fitted with mounting means for mounting on board a fuselage structure firstly, at least one front avionics rack incorporating at least one calculation unit and at least one communications bus, and secondly, a cockpit including at least one man-machine interface instrument, the mounting means comprising:

mechanical assembly means for assembling the interface instrument and the front avionics rack on the fuselage, structure; and at least one cable fitted to the at least one interface instrument and the at least one front avionics rack in order to power the at least one interface instrument and the at least one front avionics rack electrically and in order to put the at least one interface instrument and the at least one front avionics rack into communication with remote members distributed aboard the rotorcraft, the remote members comprising at least one computer, at least one piece of ancillary equipment of the rotorcraft, and at least one on-board instrument taken from a group of instruments comprising at least any one of at least one actuator, at least one information sensor, a calculation means, and a measurement means, wherein the mechanical assembly means comprise a mounting structure for jointly mounting the at least one interface instrument and the at least one front avionics rack on the fuselage structure, the mounting structure comprising a slotted body having fastener means for fastening to the fuselage structure, the slots of the slotted body providing compartments that house, in a front face of the slotted body, at least one interface instrument and that house, in a rear zone of the slotted body, at least one front avionics rack, at least one compartment providing at least one passageway for passing a unitary cabling assembly suitable for being incorporated as a block on the mounting structure and fitted with separation connectors mounted on the slotted body, the unitary cabling assembly providing a connection for the at least one interface instrument and for the at least one calculation unit with the remote members via the separation connectors.

2. The rotorcraft according to claim 1, wherein the separation connectors comprise avionics connectors for communication between the at least one front avionics rack and the remote members, the avionics connectors being segregated to provide at least one main connector set and at least one secondary connector set of a primary communications module forming part of the front avionics rack, the main connector set being an interface connector set between the calculation unit and at least one the computer, the secondary connector set being an interface connector set between the primary communications module and at least one secondary communications module incorporating a secondary data concentrator for concentrating data collected from any one of at least one the on-board instrument and/or at least one the piece of ancillary equipment.

3. The rotorcraft according to claim 2, wherein the secondary connector set is in communication with the calculation unit via a gateway component of the primary communications module.

4. The rotorcraft according to claim 2, wherein the primary module includes at least one primary digital communications bus between the calculation unit and the computer, and at least one secondary fieldbus of multiplexed type between the calculation unit and the secondary module.

5. The rotorcraft according to claim 2, wherein the secondary data concentrator for concentrating data includes the functions of receiving data, of acquiring data, of converting data from digital to analog format and from analog to digital format, and of routing information collected by the secondary data concentrator.

6. The rotorcraft according to claim 3, wherein the gateway component is also in communication with a primary data concentrator for concentrating data collected from at least one man-machine interface instrument.

7. The rotorcraft according to claim 1, wherein the unitary cabling assembly incorporates at least one of an electrical communications harness and an optical communications harness.

8. The rotorcraft according to claim 1, wherein at least one of the slots of the slotted body provides a compartment for housing at least one piece of ancillary equipment of the rotorcraft, the unitary cabling assembly incorporating at least one harness allocated to the piece of ancillary equipment.

9. The rotorcraft according to claim 8, wherein the piece of ancillary equipment housed in the compartment is an installation for providing ventilation, heating, and/or air conditioning.

10. The rotorcraft according to claim 1, wherein the slotted body provides a passage therethrough giving access to the at least one front avionics rack and to the unitary cabling assembly from the at least one compartment provided in a front face of the slotted body.

11. The rotorcraft according to claim 1, wherein the slots of the slotted body provide at least:

in a front zone of the slotted body forming a front face element of a control panel, at least one first compartment of the front face element housing at least one interface instrument;

in a rear zone of the slotted body forming a technical equipment space, at least one second compartment housing at least one front avionics rack;

in a middle zone of the slotted body between the front zone and the rear zone, at least one passage for passing the unitary cabling assembly and possibly also at least one passage giving access from the front face element to the unitary cabling assembly and to the technical equipment space; and at least one housing receiving the separation connectors.

12. The rotorcraft according to claim 1, wherein the slotted body is provided with mounting means for mounting at least one support included in the mounting structure, the support being removable and interchangeable from a between a plurality of supports, the support including at least one compartment housing at least one interface instrument.

13. The rotorcraft according to claim 1, wherein the unitary cabling assembly incorporates at least one harness for connecting at least one on-board instrument with the front avionics rack.

14. The rotorcraft according to claim 1, wherein the unitary cabling assembly incorporates auxiliary harnesses fitted with auxiliary connectors for connecting to the separation connectors, respectively of the at least one interface instrument and of the at least one front avionics rack.

15. A method of preparing a mounting structure of a rotorcraft according to claim 1, wherein the method comprises the following operations:

fabricating the slotted body;

fabricating the unitary cabling assembly fitted with the at least at least one of the separation connectors and the auxiliary connectors in a workshop and then testing the functioning of the unitary cabling assembly and, where necessary, making repairs;

mounting the unitary cabling assembly and the separation connectors on the slotted body in a workshop;

mounting the at least one interface instrument and the at least one front avionics rack housing the calculation unit on the slotted body in a workshop;

testing the functioning of the resulting mounting structure in a workshop, and, where necessary, making repairs; and installing the resulting mounting structure as tested on the fuselage structure as presented on a rotorcraft assembly line.

16. The rotorcraft according to claim 4, wherein the at least one primary digital communication bus is a type of digital communication bus of the unidirectional type, of the bidirectional type, or of the multiplexed type.

* * * * *